United States Patent Office 2,780,779
Patented Feb. 5, 1957

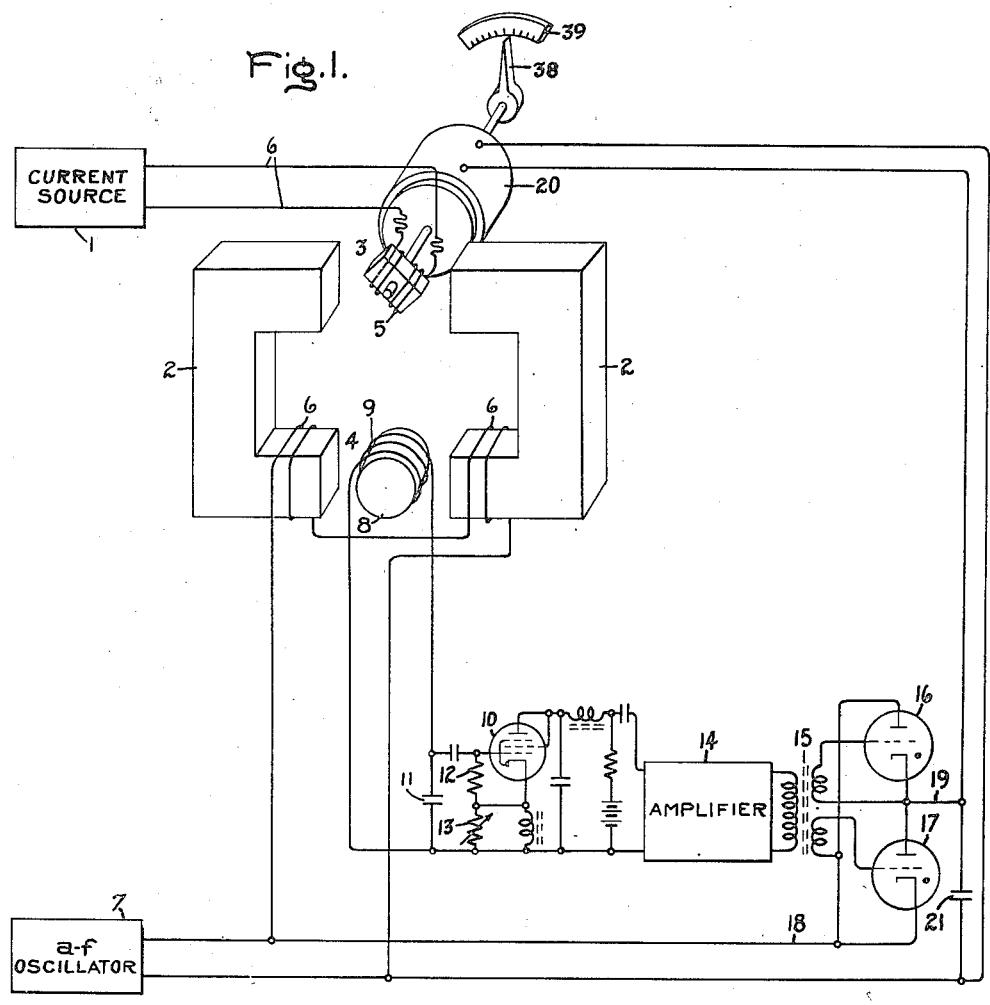

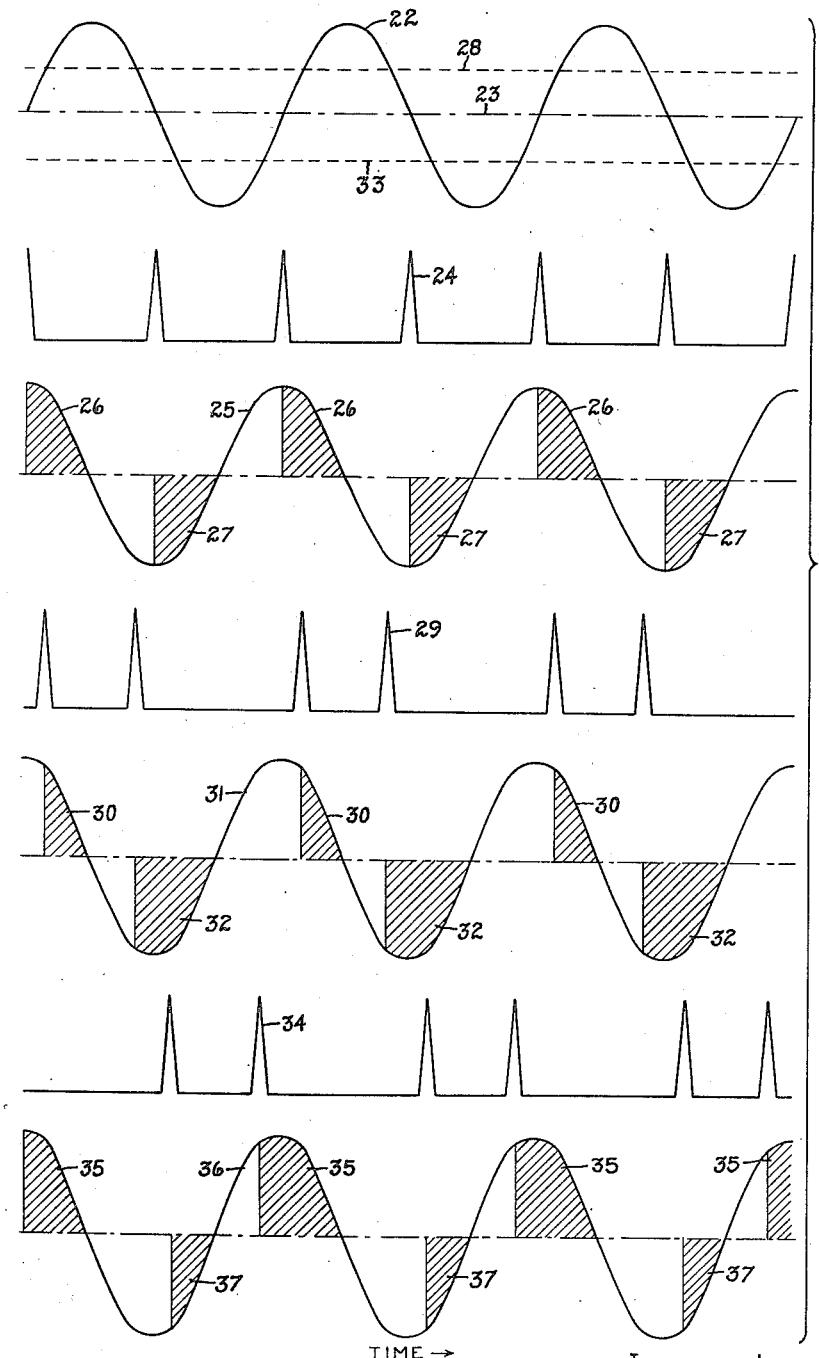

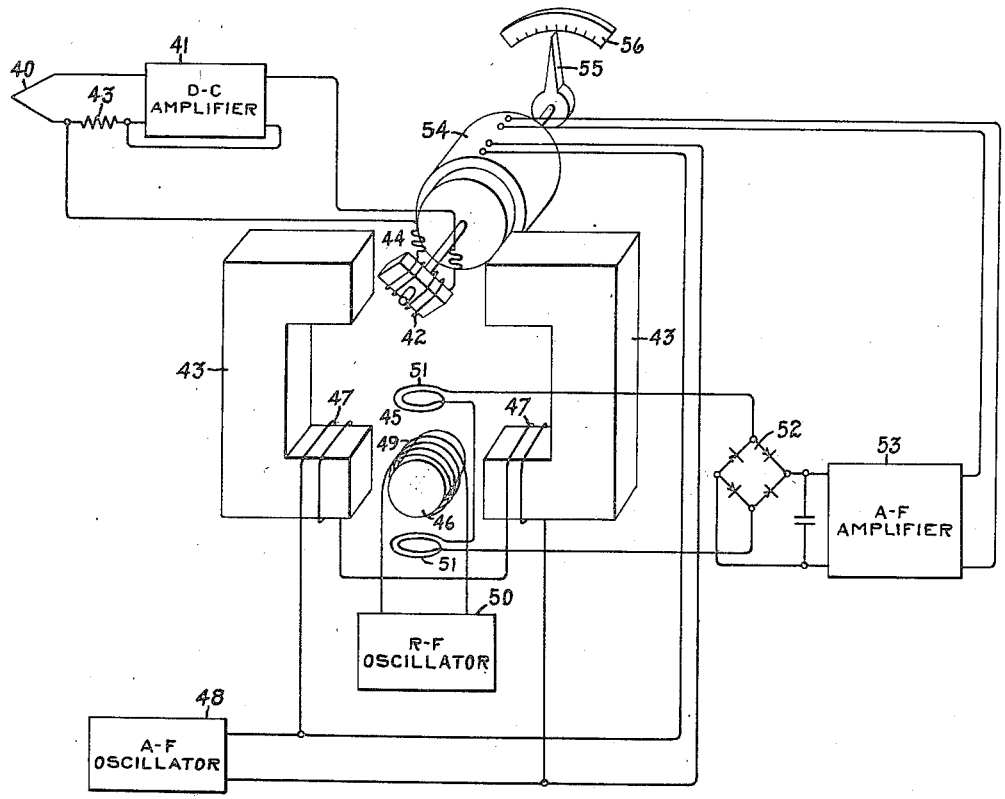

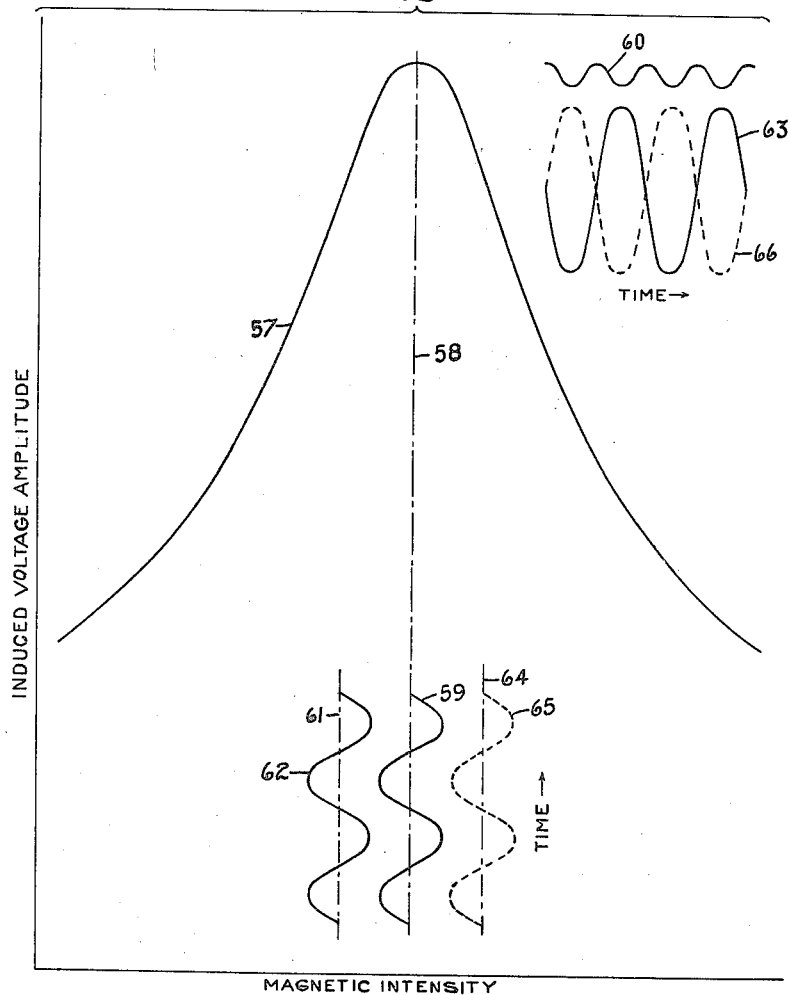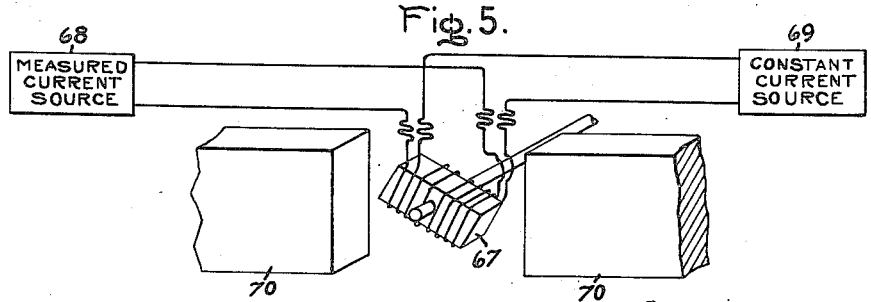

2,780,779

ELECTRIC CURRENT MEASURING APPARATUS

Albert Hansen, Jr., Lynn, Mass., assignor to General Electric Company, a corporation of New York Application December 5, 1952, Serial No. 324,234

8 Claims. (Cl. 324—99)

My invention relates to improved, high precision electric current measuring apparatus based upon magnetic resonance phenomena.

A brief description of magnetic resonance theory will aid the explanation of my invention. More complete treatments of the theory may be found in texts on atomic physics and in numerous articles which have appeared in scientific and technical publications. It will be understood that the theoretical matter presented here is for illustrative purposes only, and is not intended to limit the scope of my invention.

It is known that the nuclei of many atoms have an angular momentum, or spin, and likewise have a magnetic moment. When such nuclei are placed in a magnetic field, their magnetic moments tend to precess about the field direction at a rate known as the Larmor frequency, the value of which is given by the relation $2\pi\nu = \gamma H$, where $\nu$ is the Larmor, or precession, frequency, H is the magnetic field intensity, and $\gamma$ is a quantity known as the gyromagnetic ratio which is proportional to the quotient of the magnetic moment of the nucleus divided by its angular momentum. For any one given kind of atomic nucleus, the gyromagnetic ratio is a constant, so that the Larmor frequency is directly proportional to the magnetic field intensity. The nuclei of 26 or more kinds of atoms and isotopes are known to have magnetic moments which precess in this manner. For simplicity in the following discussion, the proton, or hydrogen nucleus, will be considered as a typical example, but my invention is not limited to the use of protons, since other nuclei may be used without materially altering the principles involved.

Chemical bonds appear to have no appreciable effect on the Larmor frequency. Consequently, the protons used in magnetic resonance apparatus may be hydrogen nuclei in any convenient chemical combination—for example, ordinary water. However, in practice small quantities of other substances, such as manganous sulphate or other paramagnetic salts, are often dissolved in the water for well-known reasons having to do with the "relaxation time," which need not be discussed to explain the present invention. A $\frac{1}{250}$ molar solution of manganous sulphate in one cc. of distilled water has been employed with good results as a proton sample in magnetic resonance equipment.

The gyromagnetic ratio $\gamma$ of the proton is approximately $2.67 \times 10^4$ per oersted-second. Thus, the Larmor frequency of proton precession in a magnetic field of H oersteds is $$\frac{2.67}{2\pi} \times 10^4 \times H$$

cycles per second. For example, if H is 1000 oersteds, the Larmor frequency is approximately 4.25 megacycles per second.

Assume that a large number of protons are placed in a homogeneous, unidirectional magnetic field, so that the magnetic moments precess about the field direction at the Larmor frequency. Considering the geometric projections of the proton magnetic moments on the field direction, it will be found that two orientations of the protons exist: some of the protons have their magnetic moments aligned with the field, which is called the parrallel orientation, while others have their magnetic moments aligned against the field, which is called the anti-parallel orientation. The anti-parallel orientation represents a higher energy level than the parallel orientation, since work must be done to turn the magnetic moments against the field. However, at temperatures normally encountered, the energy difference between the two orientations is very small compared to the energy of thermal agitation.

Because of the thermal effects, frequent transitions of individual nuclei from one orientation to the other occur, but if the protons are in thermal equilibrium, it is known that the probability as a function of time for a transition from the higher energy level to the lower energy level is slightly greater than the probability for the reverse transition, so that, under such conditions, on the average a slightly larger number of protons will be found in the lower-energy parallel orientation than in the higher-energy anti-parallel orientation. For example, of 2,000,000 protons in thermal equilibrium at room temperature, 1,000,007 may have the parallel orientation, while the remainder have the anti-parallel orientation.

Assume that a second magnetic field is introduced at right angles to the first field, and that the second field alternates at the Larmor frequency of the protons precessing in the first field. Now those protons having the low-energy parallel orientation can absorb energy from the alternating field, which increases the probability of transitions from the parallel orientation to the higher-energy anti-parallel orientation and thus tends to equalize the numbers of protons in the two energy levels. If the alternating field is sufficiently strong, the proton populations in the two energy levels soon become substantially equal, and no more energy is absorbed. But if the alternating field is a bit weaker, the absorption of energy by the protons from the alternating field may be balanced by their tendency to return to thermal equilibrium, so that there can be substantially continuous absorption of energy from the alternating field. Therefore, there is an optimum strength of the alternating field, which can be determined by experimental adjustment, at which maximum energy is absorbed by the protons. Although quantum considerations prohibit more than two orientations of protons in a magnetic field, other nuclei may have as many as ten possible orientations. This does not affect the basic principles involved, since transitions may still take place between adjacent energy levels represented by different orientations.

This absorption of energy by precessing nuclei, which generally occurs only when the frequency of the alternating field is substantially the same as the Larmor frequency of the nuclei, is called nuclear magnetic resonance. Similar phenomena, known as electronic magnetic resonance, can occur in substances having uncoupled electrons. In general, there are two classes of such substances, one class being strongly paramagnetic salts, and the other class being ferromagnetic metals and alloys.

For electronic magnetic resonance in paramagnetic salts, sometimes called paramagnetic resonance, the same relations apply as in proton resonance, except that the gyromagnetic ratio of the electron is used in place of the gyromagnetic ratio of the proton. Since the electron has a gyromagnetic ratio which is about 700 times as large as that of the proton, the Larmor frequency for paramagnetic resonance is about 700 times as great as that for proton resonance in the same magnetic field.

In ferromagnetic metals and alloys, the magnetic induction B inside the metal is not substantially equal to the magnetic field intensity H. In this electronic resonance case, sometimes called ferromagnetic resonance, the Larmor frequency $\nu$ is given by the relation $2\pi\nu = \gamma\sqrt{BH}$, where $\gamma$ is the gyromagnetic ratio of the electron, H is the magnetic field intensity, and B represents the magnetic induction which is equal to the product of the magnetic field intensity and the permeability of the metal. The present invention may utilize either nuclear magnetic resonance or electronic magnetic resonance. The generic term "magnetic resonance" includes both. Since the basic principles are the same, only nuclear resonance need be discussed in detail.

The magnetic resonance phenomenon can be detected by various means, several of which are well known. For example, assume that the alternating field is supplied by a suitably energized coil placed around the proton sample, which is a common arrangement in nuclear resonance apparatus. Energy absorption from the field by the protons at resonance causes a measurable decrease in the apparent "Q" of the coil, where Q is the well-known symbol for the ratio of energy stored per cycle to energy dissipated per cycle. This is known as the absorption effect. There is also a small, but measurable, change in the apparent inductance of the coil. This is known as the dispersion effect. Furthermore, when a second coil is placed near the proton sample with its axis orthogonal to the respective directions of the two applied magnetic fields, at resonance the precessing proton magnetic moments induce an alternating voltage in the second coil. This is known as the induction effect. While any of these three effects may be used to detect the existence of magnetic resonance conditions, in practice the absorption and induction effects are most frequently used.

The chief object of my invention is to provide improved electric current measuring apparatus having greater precision and stability than can be obtained by means heretofore commonly employed. Other objects and advantages will appear as the description proceeds.

Briefly stated, according to one aspect of my invention, I provide a magnetic structure having a gap in which is located a magnetic resonance sample. I also provide in association with this structure a rotatable coil through which the current to be measured passes. The magnetic intensity in the gap containing the nuclear resonance sample is a function of both the magnitude of the measured current and the angular position of the rotatable coil. The magnetic resonance phenomenon is used for adjusting the angular position of the rotatable coil to keep this magnetic intensity constant to a high degree of precision.

Consequently, the angular position of the coil precisely indicates the magnitude of the measured current.

My invention will be better understood from the following description taken in connection with the accompanying drawings, and its scope will be pointed out in the appended claims. In the drawings, Fig. 1 is a schematic representation of current measuring apparatus embodying principles of my invention, Fig. 2 is a group of curves used in explaining the operation of the Fig. 1 apparatus, Fig. 3 is a schematic representation of other current measuring apparatus embodying principles of my invention, Fig. 4 is a diagram used in explaining the operation of the Fig. 3 apparatus, and Fig. 5 is a schematic representation of a modification for measuring small currents.

Referring now to Fig. 1 of the drawings, an electric current to be measured is supplied by any current source 1. The apparatus for measuring this current comprises a magnetic structure 2 having air gaps 3 and 4. Structure 2 is made of ferromagnetic material, preferably laminations of high grade transformer core material, such as silicon steel. The structure 2 provides a magnetic path in which the air gaps 3 and 4 are in series. A coil 5 is rotatably positioned in gap 3, as shown, and the current to be measured is passed through coil 5 by electrical connections 6. This provides a magnetic field in gap 4, the magnetic intensity of which is a function of both the magnetitude of the measured current and the angular position of coil 5, since the flux linkage between coil 5 and structure 2 is a function of the angular position of the coil. As hereinafter explained, the angular position of coil 5 is automatically adjusted to keep the average magnetic intensity in gap 4 substantially constant, so that the angular position of coil 5 is an indication of the magnitude of the measured current.

The magnetic intensity in gap 4 is periodically varied about its average value by modulating winding 6 energized with alternating current supplied by suitable means, such as audio-frequency oscillator 7. Windings 6 may be located within the gap 4, or may be wound about structure 2, as shown.

A magnetic resonance sample 8 is located within gap 4, as shown. For example, the sample 8 may be a small quantity of water sealed in a glass tube, in which case proton magnetic resonance will be utilized. Alternatively, the sample 8 may be any substance containing nuclei having a gyromagnetic ratio other than zero, or sample 8 may be a material having uncoupled electrons. In the latter case, electronic magnetic resonance will be utilized. Since the principles are substantially the same, it will be assumed in the following discussion that the magnetic resonance sample contains water.

About sample 8 there is a coil 9 positioned with its axis at right angles to the magnetic field provided by structure 2. Coil 9 is energized by alternating current supplied by a grid-biased electron tube oscillator 10, and thus applies to sample 8 an alternating magnetic field at right angles to the field supplied by structure 2. The frequency of this alternating field is a constant determined by the resonant frequency of coil 9 and capacitor 11. If desired, for greater accuracy, this frequency can be stabilized by well-known piezoelectric crystal means.

The oscillator 10 is biased in a conventional manner by the flow of grid current through a grid bias resistor 12, so that the bias voltage applied to the grid of the oscillator is a function of the amplitude of oscillations generated, as is well known. For maximum sensitivity, the oscillator feedback resistor 13 is adjusted so that oscillations are just barely maintained.

Assume that the value of the magnetic intensity H in gap 4 satisfies the relation $2\pi f = \gamma H$, where $f$ is the frequency of oscillator 10 and $\gamma$ is the gyromagnetic ratio of the proton. Under these conditions, magnetic resonance occurs in sample 8, and the protons absorb energy from the alternating field supplied by coil 9. This absorption of energy reduces the amplitude of oscillations generated by oscillator 10, and thereby decreases the grid bias applied to the oscillator and increases the plate current conducted by the oscillator tube. Now assume that the magnetic intensity H is varied periodically about the magnetic resonance value by the alternating current supplied to modulating windings 6. The magnetic resonance relation is exactly satisfied at only two points in the modulation cycle, and consequently the absorption of energy by sample 8 varies periodically. The plate current conducted by oscillator 10 likewise varies periodically. This provides an alternating electric signal at the plate of oscillator 10. It will be shown that the phase relation of this signal to the modulating current supplied by audio-frequency oscillator 7 is a function of the average magnetic intensity in gap 4.

The electric signal supplied by oscillator 10 is amplified by a conventional amplifier 14, and by means of a pulse transformer 15 is applied to the grids of two thyratron tubes 16 and 17. The plate of tube 16 and the cathode of tube 17 are connected together to a lead 18, and the cathode of tube 16 and the plate of tube 17 are connected together to a lead 19, as shown. Leads 18 and 19 are connected to audio-frequency oscillator 7 and a small electric motor 20 in series. A capacitor 21 may be connected in parallel with motor 20. Motor 20 operates through suitable speed-reducing gears, which may be contained in the motor housing, to adjust the angular position of coil 5, as hereinafter explained.

A better understanding of how the Fig. 1 apparatus operates may be had by reference to the curves shown in Fig. 2. Curve 22 represents the alternating current supplied to modulating windings 6, and hence also represents the periodic variations of the magnetic intensity H in gap 4. Broken line 23 represents the average magnetic intensity in the gap. Assuming that the average magnetic intensity satisfies the conditions for magnetic resonance, magnetic resonance occurs in the sample each time that curve 22 crosses line 23.

For purposes of this explanation, assume further that the periodic variations in magnetic intensity are larger than the width of the magnetic resonance curve, although this is not essential for operation of the apparatus. Curve 24 then represents the energy absorption by the protons in sample 8. It will be noted that curve 24 has a sharp peak at each of the magnetic resonance points where curve 22 crosses line 23. Since the plate current conducted by oscillator tube 10 varies with the absorption of energy by sample 8, curve 24 also represents the signal which is amplified by amplifier 14 and applied to the grids of thyratron tubes 16 and 17.

Curve 25 represents the voltage between plate and cathode of tube 16, and also the voltage between cathode and plate of tube 17. It will be noted that curve 25 is substantially 90° out of phase with curve 22, since windings 6 are essentially inductive and therefore the current through windings 6 is substantially 90° out of phase with the voltage across the windings.

It is apparent that tube 16 can conduct current only during the positive half cycles of curve 25, while tube 17 can conduct current only during the negative half cycles of curve 25. Furthermore, neither of the tubes 16 and 17 conduct current until a positive pulse is applied to their grids. Once a thyratron tube has begun to conduct current, it continues to do so until its plate becomes negative with respect to its cathode. It follows that the shaded portions 26 represent the intervals during which tube 16 conducts current, while the shaded portions 27 represent periods during which tube 17 conducts current.

It will be noted that shaded portions 26 and shaded portions 27 are substantially equal in area; therefore, the two thyratron tubes conduct essentially equal amounts of current. As a result, no direct current is applied to motor 20, and the angular position of coil 5 is unchanged. This is the null, or balance position of the apparatus, in which the average magnetic intensity in gap 4 has just the right value for magnetic resonance in the sample 8. The purpose of capacitor 21 is to by-pass alternating components of current conducted by tubes 16 and 17, so that these need not flow through the motor windings.

Now assume that the value of the measured current changes so that the average magnetic intensity in gap 4 no longer has exactly the correct value for magnetic resonance. Assume that broken line 23 represents the average magnetic intensity, while broken line 28 now represents the value of magnetic intensity which satisfies the magnetic resonance conditions. Magnetic resonance occurs each time curve 22 crosses line 28, and the energy absorption in the sample 8 is represented by curve 29. It will be observed that the energy absorption curve, and hence the signal applied to the grids of tubes 16 and 17, is still a series of pulses, but that the phase relation of these pulses with respect to curve 22 has changed.

Tube 16 now conducts current during the intervals represented by the shaded areas 30 under curve 31, and tube 17 conducts current during the intervals represented by the shaded areas 32. It is evident that tube 17 now conducts more current than tube 16, so that a direct current flows through motor 20. This operates the motor to rotate coil 5, and thereby adjusts the angular position of the coil to change the average magnetic intensity in gap 4. Such rotation continues until the average magnetic intensity again satisfies the magnetic resonance conditions.

Similarly, assume that the value of the measured current has changed in the opposite sense, so that broken line 33 now represents the magnetic intensity which satisfies resonance conditions. Curve 34 represents the energy absorption in sample 8. The conduction of current by tube 16 is represented by the shaded areas 35 under curve 36, and the conduction of current by tube 17 is represented by the shaded areas 37. It is apparent that tube 16 now conducts more current than tube 17, so that direct current again flows through motor 20, but in the opposite direction. Motor 20 again rotates coil 5 in a direction to bring the average magnetic intensity back to the magnetic resonance value.

In this way, the angular position of coil 5 is automatically adjusted to keep the magnetic intensity in gap 4 substantially at the constant value required for magnetic resonance in sample 8. Consequently, the angular position of coil 5 indicates the magnitude of the measured current. Since the magnetic resonance curve may be quite narrow, equivalent to that of an electrical resonant circuit having a Q of 70,000 or more, this indication of current value is very precise.

To provide easily read indications of the angular position of coil 5, and hence of the magnitude of the measured current, a pointer 38 may be provided which is rotated in synchronism with coil 5, for example, by being attached to the same shaft. Pointer 38 cooperates with a suitably calibrated dial 39. Instead of the pointer and dial for indicating the current values, I may provide recording apparatus, control apparatus, or any other device actuated by changes in an angular position.

Fig. 3 illustrates another form of my improved current measuring apparatus incorporated in a system for measuring temperature. The temperature to be measured acts upon a thermocouple junction 40 to produce an electromotive force which is a function of the temperature, as is well known. A D. C. amplifier 41, of any suitable type, provides a current proportional to this electromotive force through a coil 42. Preferably, a feedback resistor 43 is common to the input and output circuits of the D. C. amplifier, in the conventional manner, so that the output current of the amplifier produces a voltage drop across feedback resistor 43 which substantially balances the electromotive force provided by the thermocouple. Thus the output current of the D. C. amplifier is accurately proportional to the thermocouple electromotive force.

A magnetic structure 43 is provided with two air gaps 44 and 45. The coil 42 is rotatably positioned in gap 44. A magnetic resonance sample 46 is located in gap 45. Modulating windings 47 are supplied with alternating current by an audio-frequency oscillator 48. The coil 49, wound about sample 46 as shown and energized by a radio-frequency oscillator 50, provides a constant-frequency alternating magnetic field at right angles to the field provided by magnetic structure 43. When the value of the magnetic intensity in gap 45 satisfies the resonance relation, magnetic resonance occurs in sample 46.

Also adjacent to sample 46 is a coil 51 having its axis at right angles to both of the magnetic fields applied to sample 46. When magnetic resonance occurs in sample 46, an alternating voltage is induced in coil 51, according to the known induction effect of magnetic resonance.

It will be found that this voltage is amplitude modulated, as hereinafter explained. The voltage induced in coil 51 is rectified, or demodulated, by a bridge-type rectifier 52, and the resulting signal is amplified by an audio-frequency amplifier 53 and then applied to the control winding of a two-phase servomotor 54. If desired, a radio-frequency amplifier may be inserted between coil 51 and rectifier bridge 52. Current from audio-frequency oscillator 48 is applied to the field winding of servomotor 54.

The motor 54 is of a well-known type which rotates in a direction depending upon the phase relation between the respective currents applied to its field and control windings. The motor operates through suitable speed reducing gears, which may be contained in the motor housing, to adjust the angular position of coil 42. This angular position may be indicated by a pointer 55 which cooperates with a suitably calibrated dial 56.

Operation of the Fig. 3 apparatus may best be understood by reference to the diagram shown in Fig. 4. In this diagram, the curve 57 is a magnetic resonance curve, which shows the relation between the amplitude of the voltage induced in coil 51 and the magnetic intensity in gap 45. The broken line 58, which passes through the peak of the resonance curve 57, represents the value of magnetic intensity which exactly satisfies the magnetic resonance equations. It will be appreciated that the magnetic resonance curve is actually very sharp and narrow, and that the coordinates representing zero magnetic intensity are very far beyond the left-hand side of Fig. 4.

Now assume that the average magnetic intensity in gap 45 exactly satisfies the magnetic resonance relation, and thus is represented by line 58 of Fig. 4. Further assume that the current through modulating windings 47 varies this magnetic intensity by an amount which is small compared to the width of the magnetic resonance curve. The varying magnetic intensity may then be represented by the curve 59. By projecting each point of curve 59 on curve 57, it may be seen that the amplitude of the induced voltage varies in a manner represented by curve 60. It will be noted that curve 60 contains even harmonics only of the modulation frequency, and that the fundamental component is zero. Consequently, under such conditions, the signal applied to the control winding of motor 54 is zero, and the motor remains stationary.

Now assume that the current through coil 42 changes in value, so that the average magnetic intensity in gap 45 is now represented by the broken line 61. As this is modulated, the varying magnetic intensity in the gap is represented by curve 62. Projecting curve 62 upon curve 57, point by point, it appears that the amplitude of the induced voltage varies in the manner represented by curve 63. It is now apparent that the voltage induced in coil 51 is strongly modulated at the modulation current frequency, and therefore a considerable signal is applied to the control winding of motor 54. It may be noted that this signal is 180° out of phase with the current through windings 47, and thus is 90° out of phase with the voltage across the windings 47. Thus, when audio-frequency amplifier 53 has proper phase characteristics, the currents applied to the field and control windings of motor 54 are 90° out of phase, which is the proper relation for the operation of the servomotor. Motor 54 adjusts the angular position of coil 42, to bring the average magnetic intensity in gap 45 back to the magnetic resonance value.

Similarly, assume that the magnitude of current in coil 42 again changes, so that the average magnetic intensity in gap 45 is now represented by the broken line 64, and the modulated magnetic intensity is represented by the dashed curve 65. Now the modulation of the voltage induced in coil 51 is represented by the dashed curve 66. Thus, a signal is again applied to the control winding of motor 54, but of opposite phase to the applied signal in the case previously considered. This causes motor 54 to rotate coil 42 in the opposite direction, which again adjusts the angular position of the coil to bring the average magnetic intensity in gap 45 back to the magnetic resonance value.

It will be appreciated that the A. C. servomotor circuit can be used equally well with the absorption effect system shown in Fig. 1, by applying the A. C. output of amplifier 14 to the control winding of a two-phase servomotor, and applying current from oscillator 7 to the servometer field winding. Generally, the A. C. system will be more suitable when the modulation amplitude is small compared to the width of the magnetic resonance peak. Similarly, the D. C. servo system can be used with induction-effect systems of the type shown in Fig. 2.

Fig. 5 is a schematic partial view of a modification which may be used for measuring very small currents. The apparatus as a whole may be similar to that shown in Fig. 1, or that shown in Fig. 3, the only difference being that the rotatable member 67 is provided with two coils, as shown. The current to be measured, from any suitable source 68, is passed through one of these coils, and a current of constant value, from any suitable source 69, is passed through the other coil. The apparatus operates as hereinbefore explained automatically to adjust member 67 to an angular position which corresponds to the algebraic sum of the current magnitudes through the two coils. Preferably, the value of the constant current is such that member 67 has an intermediate angular position, such that the flux linkage between member 67 and magnetic structure 70 is neither maximum nor minimum, when the measured current is zero. When the measured current is not zero and flows in the same direction as the constant current, the angular position of member 67 is adjusted automatically to decrease the flux linkage between member 67 and structure 70. When the measured current flows in the opposite direction, the angular position of member 67 is readjusted to increase the flux linkage. Alternatively, either one of the two coils may be placed on structure 70 rather than on rotor 67, or a permanent magnet may be used to provide the bias magnetic flux.

It will be understood that my invention is not limited to the specific embodiments herein illustrated and described, and that the following claims are intended to cover all changes and modifications which do not depart from the true spirit and scope of the invention.

What I claim as new and desire to secure by Letters Patent of the United States is:

1. Electric current measuring apparatus comprising a magnetic structure having first and second gaps, a coil rotatably positioned within said first gap, connections for passing the current to be measured through said coil whereby a first magnetic field is provided in said second gap having a magnetic intensity which is a function of both the magnitude of the measured current and the angular position of said coil, modulating windings positioned on said magnetic structure for varying the magnetic intensity of said first field, means supplying an alternating current to energize said modulating windings, magnetic resonance apparatus responsive to the magnetic intensity in said second gap including a magnetic resonance sample positioned in said second gap and means for applying to said sample an alternating magnetic field at right angles to said first field, said magnetic resonance apparatus functioning to establish an electrical signal related in value to the magnetic intensity in said second gap, and means responsive to said electrical signal for adjusting the angular position of said coil to maintain the magnetic intensity in said second gap substantially constant whereby the angular position of said coil indicates the magnitude of said current.

2. Electric current measuring apparatus comprising a magnetic structure providing a magnetic path having two air gaps in series, a coil rotatably positioned within the first of said gaps, connections for passing the current to be measured through said coil whereby a first magnetic field is provided in the second of said gaps having a magnetic intensity which is a function of both the magnitude of the measured current and the angular position of said coil, modulating windings positioned on said magnetic structure for varying the magnetic intensity of said first field, means supplying an alternating current to energize said modulating windings, magnetic resonance appartus responsive to the magnetic intensity in said second gap including a magnetic resonance sample positioned in said second gap and means for applying to said sample an alternating magnetic field at right angles to said first field, said magnetic resonance apparatus functioning to establish an electrical signal related in value to the magnetic intensity in said second gap, and means responsive to said electrical signal for adjusting the angular position of said coil to maintain the magnetic intensity in said second gap substantially constant whereby the angular position of said coil indicates the magnitude of said current.

3. Electric current measuring apparatus comprising a magnetic structure having first and second gaps, a coil rotatably positioned within said first gap, connections for passing the current to be measured through said coil whereby a first magnetic field is provided in said second gap having a magnetic intensity which is a function of both the magnitude of the measured current and the angular position of said coil, modulating windings positioned on said magnetic structure for varying the magnetic intensity of said first field, means supplying an alternating current to energize said modulating windings, magnetic resonance apparatus responsive to the magnetic intensity in said second gap including a proton sample positioned in said second gap and means for applying to said sample an alternating magnetic field at right angles to said first field, said magnetic resonance apparatus functioning to establish an electrical signal related in value to the magnetic intensity in said second gap, and means responsive to said electrical signal for adjusting the angular position of said coil to keep the magnetic intensity of said first field substantially at the constant value required for magnetic resonance in said sample whereby the angular position of said coil indicates the magnitude of said current.

4. Electric current measuring apparatus comprising a magnetic structure having first and second gaps, a coil rotatably positioned within said first gap, connections for passing the current to be measured through said coil whereby a first magnetic field is provided in said second gap having an average magnetic intensity which is a function of both the magntiude of the measured current and the angular position of said coil, modulating windings positioned on said magnetic structure for varying the magnetic intensity of said first field, means supplying an alternating current to energize said modulating windings, magnetic resonance apparatus responsive to the magnetic intensity in said second gap including a magnetic resonance sample positioned in said second gap and means for applying to said sample an alternating magnetic field at right angles to said first field, said magnetic resonance apparatus functioning to establish an electrical signal related in value to the magnetic intensity in said second gap, and means responsive to said electrical signal for adjusting the angular position of said coil to keep the average magnetic intensity of said first field substantially at the constant value required for magnetic resonance in said sample whereby the angular position of said coil indicates the magnitude of said current.

5. Electric current measuring apparatus comprising amplifier means providing a direct current related in value to the quantity to be measured, a magnetic structure having first and second gaps, a coil rotatably positioned within said first gap, connections for passing said direct current through said coil whereby a first magnetic field is provided in said second gap having a magnetic intensity which is a function of both the magnitude of the direct current and the angular position of said coil, modulating windings positioned on said magnetic structure for varying the magnetic intensity of said first field, means supplying an alternating current to energize said modulating windings, magnetic resonance apparatus responsive to the magnetic intensity in said second gap including a magnetic resonance sample positioned in said second gap and means for applying to said sample an alternating magnetic field at right angles to said first field, said magnetic resonance apparatus functioning to establish an electrical signal having a phase relation which is a function of the magnetic intensity in said second gap, and servomotor means responsive to said phase relation for automatically adjusting the angular position of said coil to maintain the magnetic intensity in said second gap substantially constant whereby the angular position of said coil indicates the magnitude of said current.

6. Electric current measuring apparatus comprising a magnetic structure having first and second gaps, two coils rotatably positioned within said first gap and movable in unison therein, connections for passing the current to be measured through one of said coils, means for passing a current of constant value through the other of said coils, whereby a first magnetic field is provided in said second gap having a magnetic intensity which is a function of both the algebraic sum of the magnitudes of said currents and the angular position of said coils, modulating windings positioned on said magnetic structure for varying the magnetic intensity of said first field, means supplying an alternating current to energize said modulating windings, magnetic resonance apparatus responsive to the magnetic intensity in said second gap including a magnetic resonance sample positioned in said second gap and means for applying to said sample an alternating magnetic field at right angles to said first field, said magnetic resonance apparatus functioning to establish an electrical signal related in value to the magnetic intensity in said second gap, and means responsive to said electrical signal for adjusting the angular position of said coils to maintain the magnetic intensity in said second gap substantially constant whereby the angular position of said coils indicates the magnitude of the measured current.

7. Electric current measuring apparatus comprising a magnetic structure having first and second gaps, a first coil rotatably positioned within said first gap, connections for passing the current to be measured through said first coil, whereby a first magnetic field is provided in said second gap having an average magnetic intensity which is a function of both the magnitude of the measured current and the angular position of said first coil, modulating windings positioned on said magnetic structure for varying the magnetic intensity of said first field, means supplying a first alternating current to energize said modulating windings, a magnetic resonance sample in said second gap, a second coil positioned for applying to said sample an alternating magnetic field at right angles to said first field, a grid biased electron tube oscillator supplying a second alternating current to energize said second coil, said oscillator conducting a current which varies with the energy absorption of said sample at magnetic resonance, thereby providing an electric signal which varies in its phase relation to said first alternating current as a function of the average magnetic intensity of said first field, and means automatically adjusting the angular position of said first coil in accordance with said phase relation to keep the average magnetic intensity of said first field substantially constant, whereby the angular position of said first coil indicates the magnitude of the measured current.

8. Electric current measuring apparatus comprising a magnetic structure having first and second gaps, a first coil rotatably positioned within said first gap, connections for passing the current to be measured through said first coil, whereby a first magnetic field is provided in said second gap having an average magnetic intensity which is a function of both the magnitude of the measured current and the angular position of said first coil, modulating windings positioned on said magnetic structure for varying the magnetic intensity of said first field, means supplying a first alternating current to energize said modulating windings, a magnetic resonance sample in said second gap, a second coil positioned for applying to said sample an alternating magnetic field at right angles to said first field, means supplying a second alternating current to energize said second coil, a third coil adjacent to said sample having its axis at right angles to both of said magnetic fields, whereby an electric signal is induced in said third coil which varies in its phase relation to said first alternating current as a function of the average magnetic intensity of said first field, and means for automatically adjusting the angular position of said first coil in accordance with said phase relation to keep the average magnetic intensity of said first field substantially constant, whereby the angular position of said first coil indicates the magnitude of the measured current.

References Cited in the file of this patent

UNITED STATES PATENTS 2,598,494   Hershberger _____ Mar. 18, 1952

FOREIGN PATENTS 532,991   Great Britain _____ Feb. 4 1941